(12) United States Patent
Antanouski

(10) Patent No.: US 7,528,379 B2
(45) Date of Patent: May 5, 2009

(54) PORTABLE SYSTEM FOR DETECTION AND IDENTIFICATION OF GAMMA, NEUTRON AND X-RAY RADIATION

(76) Inventor: Aliaksandr A. Antanouski, Minsk (BY); Ludmila Antanovskaya, legal representative, 901 N. Pitt St., Suite 325, Alexandria, VA (US) 22314

( * ) Notice: Subject to any disclaimer, the term of this patent is extended or adjusted under 35 U.S.C. 154(b) by 0 days.

(21) Appl. No.: 12/203,850

(22) Filed: Sep. 3, 2008

(65) Prior Publication Data
US 2008/0315107 A1    Dec. 25, 2008

Related U.S. Application Data

(63) Continuation of application No. 10/544,279, filed on Aug. 3, 2005, now Pat. No. 7,429,736.

(30) Foreign Application Priority Data

Jan. 28, 2004    (WO) ............... PCT/BY2004/000003

(51) Int. Cl.
G01T 1/36    (2006.01)
(52) U.S. Cl. ............................. 250/370.09
(58) Field of Classification Search ............ 250/370.09
See application file for complete search history.

(56) References Cited

U.S. PATENT DOCUMENTS 7,429,736 B2 *   9/2008   Antanouski ............ 250/370.09
2004/0149918 A1 * 8/2004   Craig et al. ............ 250/370.01

* cited by examiner

*Primary Examiner*—David P Porta
*Assistant Examiner*—Marcus H Taningco
(74) *Attorney, Agent, or Firm*—Bardmesser Law Group

(57) ABSTRACT

A portable hand-held system for identification of a radiation source includes a portable detection unit that detects gamma radiation, X-ray radiation and neutron radiation emitted due to nuclear decay in the radiation source being inspected and provides a corresponding detection signal based on the radiation. A radioisotope analysis unit analyzes radiation detected by the detection unit for determining radioisotope information. A display unit for displaying results of the analysis to a user, including radiation spectrum and the radioisotope information. A GPS receiver provides a current position information. A connecting unit communicates the results of the analysis and the current location to a remote computer. The detection unit, the radioisotope analysis unit, the display unit, the GPS receiver and the connecting unit form an integral device. The common housing includes a personal communicator with a microprocessor for the analyzing of the radiation spectra.

16 Claims, 3 Drawing Sheets

Figure 1:
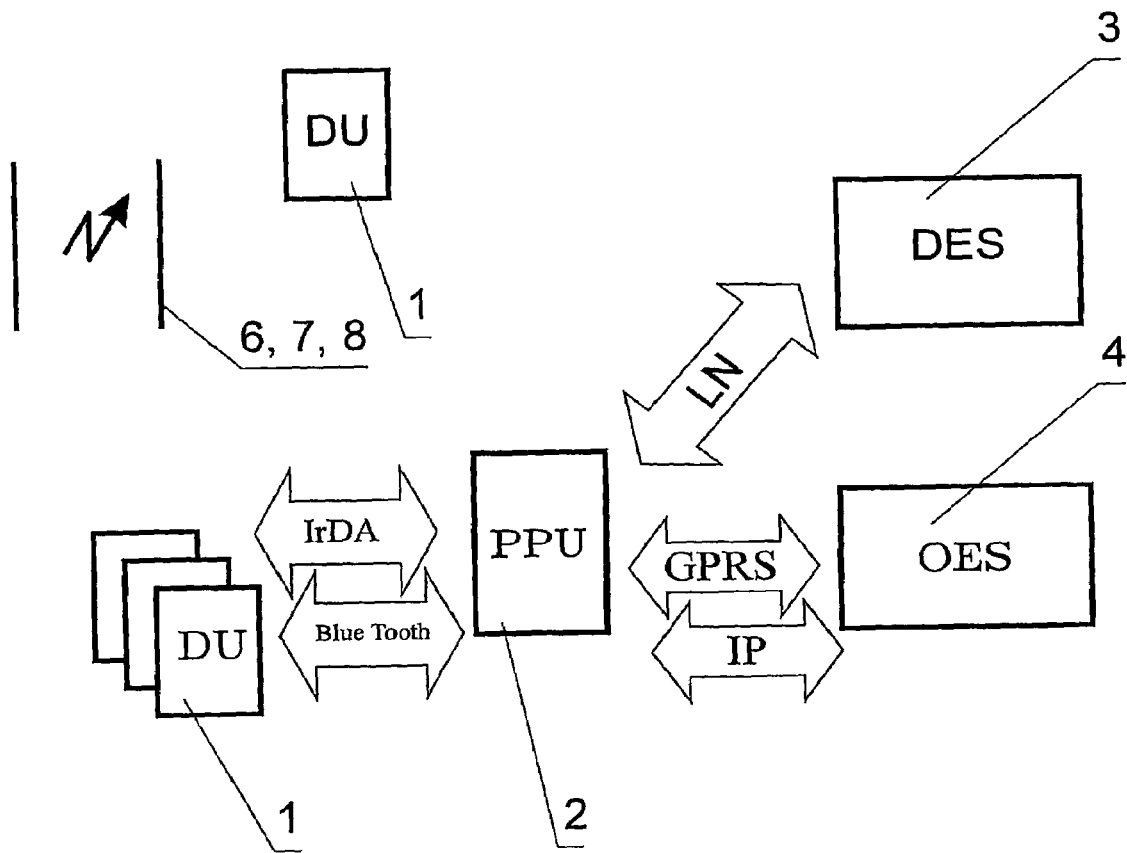

PORTABLE SYSTEM FOR DETECTION AND IDENTIFICATION OF GAMMA, NEUTRON AND X-RAY RADIATION

CROSS-REFERENCE TO RELATED APPLICATIONS

This application is a continuation of U.S. patent application Ser. No. 10/544,279, filed on Aug. 3, 2005, which is a National Phase of PCT/BY2004/000003, filed on Jan. 28, 2004, which are both incorporated by reference herein in their entirety.

BACKGROUND OF THE INVENTION

1. Field of the Invention

This invention relates to systems of identifying remote objects by detection of gamma, X-ray and neutron radiations, in particular, to systems that allow the identification of objects that are concealed or forbidden to transport, for example, at customs, border check-points, and the like.

2. Description of the Related Art

CZT detectors have been known from "X-Ray and Gamma Ray Detector High Resolution CZT Cadmium Zinc Telluride", web pages, amptek.com, Apr. 11, 2001, 8 pages and "Charge Trapping in XR-100T-CZT Detectors Application Note", web pages, amptek.com, Apr. 18, 2001, 15 pages. A hand-held radiation detector, (CZT spectrometer) designed by Los Alamos National Lab. uses a Cadmium-Zink-Tellurium (CZT) semiconductor detector that is capable of identifying gamma and neutron radiation of radioactive materials. In real time the detector produces precise data for the portable device, insensitive to a temperature variation of the environment. The detector includes a CZT chip installed in a housing with a charge-sensitive amplifier and an input-output unit for spectrum analyzing, as well as a multichannel analyzer with a microcontroller. In this device, specialized software is used that links to a built-in microcontroller and monitoring operations in CZT spectrometer.

A disadvantage of this device is the placement of a gamma and X-rays detector in one housing with a hand computer, which does not allow keeping several sensing devices under the control. U.S. Pat. No. 6,668,277 describes a multi-channel analyzer designed to conveniently gather, process, and distribute spectrographic pulse data. The multichannel analyzer may operate on a computer system having memory, a processor, and the capability to connect to a network and to receive digitized spectrographic pulses.

The multi-channel analyzer may have a software module integrated with a general purpose operating system that may receive digitized spectrographic pulses for at least 10,000 pulses per second. The multi-channel analyzer may further have a user-level software module that may receive user-specified controls dictating the operation of the multi-channel analyzer, making the multi-channel analyzer customizable by the end user. The user-level software may further categorize and conveniently distribute spectrographic pulse data employing non-proprietary, standard communication protocols and formats.

The analog imperfection is a limitation of the functional capabilities of the final device that includes only reception, signal coding from the sensor and its transmission through a multichannel communication line, including Internet signal, corresponding to received signal spectrum.

Also known from U.S. Pat. No. 4,550,381 is a hand-holdable, battery-operated, microprocessor-based spectrometer gun that includes a low power matrix display and sufficient memory to permit bath real-time observation and extended analysts of detected radiation pulses, Universality of the incorporated signal processing circuitry permits operation with various detectors having differing pulse detection and sensitivity parameters.

Utility Model, Russian Federation No. 31001, shows as a prototype, a system for A remote radiation control and objects identification containing a stationary detection system of fissionable and nuclear materials, connected with a relevant information monochannel with a personal computer having a display device, information and signal recording system, with the capability of an information transfer by means of information channels, which is supplied with the video system device, connected with video images synchronization device and to fissionable and nuclear materials readings recorder (with a timer).

The imperfection of the known system is in its stationary state-only the objects passing through a window of the fixed system can be checked, and it is impossible for an authorized person to leave a place of observation, thereby leaving the system without control. Moreover the system selected as the prototype, is closed and does not permit the use of additional resources, and also to work simultaneously with different types of detectors.

SUMMARY OF THE INVENTION

The task of the present invention is to create a mobile and simultaneously high capacity object detection and identification system according to its gamma, X-ray and/or neutron radiation. Moreover, an object of the invention is to make it possible to develop a distributed multilevel system, for departmental usage, and an open system for common usage. Briefly, the invention provides a device to detect gamma, X-ray and neutron radiations from an object that includes a detection unit and a preprocessing unit. The detection unit is created separately with a micro controller and a data transfer device.

The preprocessing unit has a display, microprocessor, input unit, a connecting unit for communicating with an expert system, a channel for data acquisition from the detection unit, and a spectrums analysis unit.

The connecting unit for communicating with the expert system of objects identification is equipped additionally with a channel for bidirectional (i.e., two-way) transfer of audio and video information.

A portable computer with a connected radiotelephone or other mobile information reception and transfer device, for example, smart phone, personal communicator or portable computer, is used as preprocessing device. The preprocessing unit is supplied additionally with a video information input unit, for example, with a video camera. Several detection units can be used, each supplied with an identification marker to interact with the preprocessing unit.

The detection unit and preprocessing device can be disposed in a common housing and the detection unit may be changeable.

The system of objects identification by gamma, X-ray and neutron radiation includes a detection unit and an information preprocessing unit of two hierarchic parts, one of which is the expert system, located in a network, and they are interconnected by a communication link. According to the invention, the expert system is connected by a communication link with a national and/or departmental emergency warning system that is activated in case of emergency situations.

The expert system may also include a person-expert in the field of objects identification. The construction of the device in the form of separate, spaced-apart modules that are interconnected by a communication link, where the detection unit is realized with a separate micro controller, provides implicit advantages, for example, object identification directly in the place where it is, irrespective of identification place and object complexity. The size of the detection unit with a microcontroller can be small and it can be placed in the given place of control zones. Moreover, the departmental network allows the control of all authorized experts staff operation from one working place. Information processing capabilities in every specific situation rise considerably owing to porting of previously adjusted expert system. It is enough to have one central data file for all preprocessing devices servicing, that allows the making of data renew and actualization for all users simultaneously.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

Figure 2:
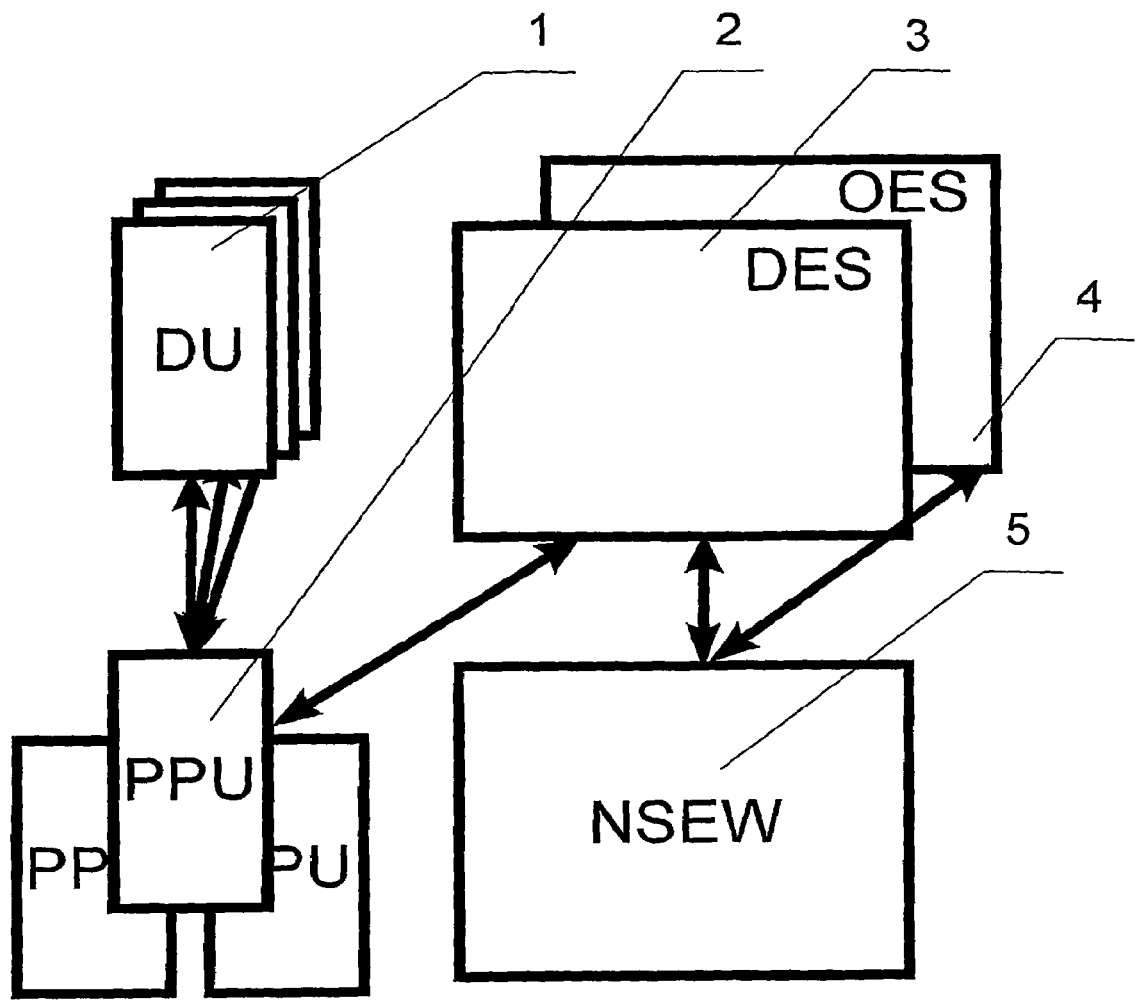
Figure 3:
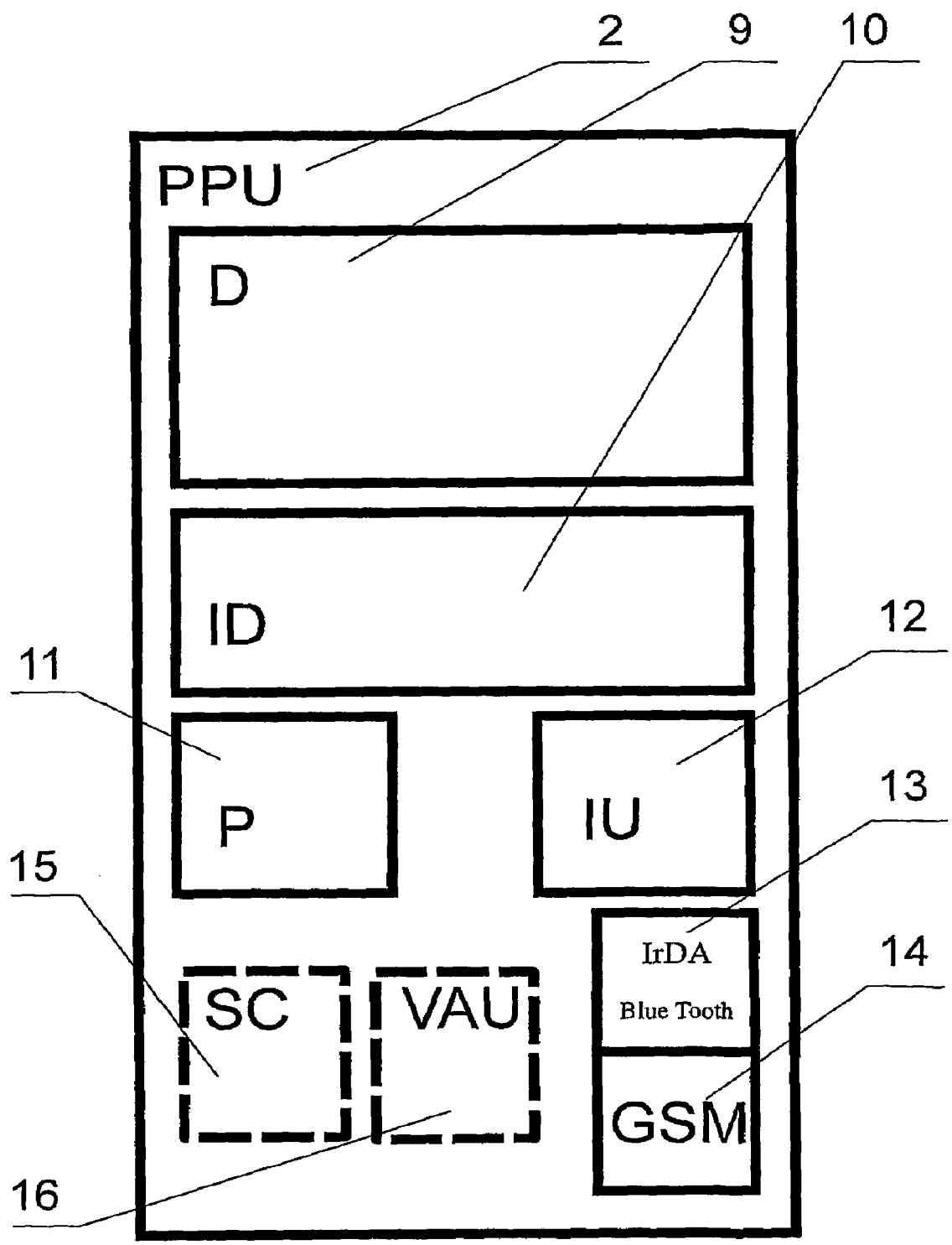

In the drawings:

FIG. 1 schematically illustrates a detection system in accordance with the invention;

FIG. 2 schematically illustrates the interaction of the components of the detection system; and FIG. 3 illustrates a block diagram of a preprocessing unit in accordance with the invention.

DETAILED DESCRIPTION OF THE PREFERRED EMBODIMENTS

Reference will now be made in detail to the preferred embodiments of the present invention, examples of which are illustrated in the accompanying drawings.

Referring to FIG. 1, the objects registration and identification device includes the detection unit (DU) 1, preprocessing unit (PPU) 2 with a display and input unit, and departmental expert system (DES) 3. The devices are connected in a local network (LN). The expert system can be located in a open network, for example, an open expert system in Internet (OES) 4. The system can contain national or other state or intergovernmental system of emergency warning (NSEW) 5. When the system is used at a customs terminal, the detection units 1 can be installed in the check points 6, passengers passages 7 and in places of transport thoroughfare 8. The preprocessing unit 2 is located where there is an authorized person (not shown).

Referring to FIG. 3, the preprocessing unit 2 includes display unit D 9 and information input device (ID) 10, which can be realized as keyboard or graphical input (graffiti); processor (P) 11 and interface units (IU) 12. There is specialized software in P, which carries out the following actions:

Selection performance parameters (search, measurement and accumulation of scintillation spectrums):

Identification of a connected DU I under its identification number;

Information interchange with DU 1 and information output in D 9;

Objects identification according to accumulated scintillation spectra;

Information exchange through IU 12 with exchange interfaces of Blue Tooth or Wi-Fi with DES usage or through GSM with GPRS and OES usage.

The device is supplied with a unit of the wireless link 13 with the detection units 1 (for example, IrDA or Blue Tooth) and connection unit 14 (for example, GSM) with DES expert system 3 or OES 4. Preprocessing unit 2 can include a scanner (SC) 15 and information video-audio input unit (VAU) 16.

The device and system work in the following way.

The detection unit 1 can be used as an independently operating device supplied with the microprocessor controller and information transfer devices, and also together with PPU device 2 (which can be any of portable devices (Mobile Device)—smart phone, notebook, communicator, etc.). DU 1 should be handled by persons monitoring for gamma, X-ray and neutron sources, (RS), or be installed in the specially assigned places. These inspectors should stay in special control zones (customs and/or frontier zones) or in expected places of RS occurrence (airports, railway or sea-ports, places of people gathering, control check points of materials, foodstuffs etc.).

Structurally, the OES or DES are constructed identically, and differ only by arrangement (either in corporate (local) DES network or in OES Internet) and by their databases. By request, the user (authorized person) gets instructions from OES or DES, following which a decision on the further actions is made. In the case of atypical situations, when OES or DES are not able to make a decision, the experts from crisis centers are linked up to the operation, and having analyzed all user actions and theirs results, direct further actions and make a decision on the arisen situation hazard.

In a DU 1 there is a built-in honker, which can be used independently (without PPU) or can be switched-off at the command of PPU. In this case, the honker will be used for an audio alarm. The DU 1 with PPU 2 Is located at the persons exercising control of the detection process automation, searching, localization, measuring, initial identification of gamma, X-ray and neutron radiation sources and checking connection with higher hierarchic system.

In the case of critical situations, for example, when the radiation permissible level is exceeded, or object forbidden to transportation is identified, DES automatically contacts with ENSEW 5. In this case, the authorized persons have duty regulations that provide for immediate localization and an immobilization of the object.

The additional usage of a scanner, for example, for scanning a bar code, makes it possible for an authorized person to increase input speed of the standardized information indicated by a bar code.

The opportunity of linking the PPU 2 and DU 1 in one housing allows an authorized person to localize and check objects in any place, where it is difficult to install the stationary detection units. Owing to that fact, the system mobility is considerably improved. Moreover, the replacement of one detector in the PPU by another, allows readjusting of the device quickly to another radioactive radiation type.

Thus, the wireless communication of a DU 1 and PPE 2 allows the replacement of sensors without any wires commutation. The use of the Internet for an open expert system arrangement allows considerable savings in material resources during system installation in control zones. In this case, the user purchases only detection units and preprocessing units, and can use computing resources in a common user network. At that, the open expert system can operate on a commercial basis.

Thus, usage of all characteristics allows a solution to the problem: to create the mobile and simultaneously powerful enough objects registration and identification system. The technical documentation is prepared and the prototype models with smart phone Mitac Mio 8380 were made.

Registration of gamma, X-ray and neutron radiation in the search mode is carried out in zones, in which joint action with additional equipment applied for RS check in these zones is possible: transport, foot-passengers or luggage monitors. Upon determination in an RS control zone, a detection signal is transmitted over transmission channels to the preprocessing unit 2, where automatic initial identification of this source with the help of PPU 2 intrinsic computing resources occur. If the user is not able on his own to make a decision about the danger of the arisen situation or there are no PPU computing resources 2, for example, the received spectrum is absent in the CPC database, then the user can contact the higher hierarchic expert system (by local network when working with the departmental expert system DES 3 or by GPRS or IP when working with expert system located in common user network OES 4). In this case, the expert system starts to control the user's actions, sending instructions to him and receiving the results of his actions (measured values, accumulated spectrums, etc.).

The obtained data are processed by DES 3 or OES 4 and are returned as user instructions for additional monitoring or RS identification. All user actions are saved in the database and can be inspected by the expert after addressing to him. If there are not enough DES 3 resources, the system connects with the, expert in the field of objects identification, which can demand additional actions or information from the user, including information on the RS over video channel.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A radiation analysis system comprising:
    a detection unit for detection of gamma, X-ray and neutron radiations resulting from nuclear decay from a radiation source and providing a corresponding detection signal, the detection unit including a microprocessor and an information transfer device;
    a preprocessing unit for analyzing the detection signal to identify the radiation source, the preprocessing unit including a display unit, an information input device, a processor having a spectrum analysis unit for identification of radioisotopes based on the radiations and a connecting unit for communicating with an expert system for receiving instructions and radioisotope information therefrom; and
    a common housing enclosing the detection unit and the preprocessing unit.

2. The radiation analysis system of claim 1, wherein the connecting unit performs two-way transfer of audio and video information.

3. The radiation analysis system of claim 1, wherein the preprocessing unit is a mobile device selected from the group consisting of a smart phone, a personal communicator and a notebook computer.

4. The radiation analysis system of claim 1, wherein the preprocessing unit includes an optical scanner.

5. The radiation analysis system of claim 1, wherein the preprocessing unit includes a GPS receiver to determine a geographic location of the radiation analysis system.

6. The system of claim 1, wherein the common housing includes a personal communicator with a processor for the analyzing of the radiation spectra.

7. The system of claim 1, wherein the common housing includes a mobile telephone with a processor for the analyzing of the radiation spectra.

8. A portable radiation analysis system comprising:
    a detection unit for detecting gamma, X-ray and neutron radiation resulting from nuclear decay in a radiation source, the detection unit providing a corresponding detection signal;
    a preprocessing unit for receiving and analyzing the detection signal to identify the radiation source, the preprocessing unit including a display unit, an information input device, a processor having a radiation spectrum analysis unit and a connecting unit for communicating with an expert system for receiving instructions therefrom for further processing of the radiation source; and
    a common housing enclosing the detection unit,
    wherein the portable radiation analysis system interfaces to a remote expert system for receiving instructions from the preprocessing unit for further processing of the radiation source.

9. The portable radiation analysis system of claim 8, wherein the preprocessing unit includes a global positioning system receiver to determine a geographic location of the radiation source.

10. A portable hand-held system for identification of a radiation source, the system comprising:
    a portable detection unit that detects ionizing radiation from nuclear decay in the radiation source and provides a corresponding detection signal based on the detected radiation;
    a spectrum analysis unit for analyzing a radiation spectrum corresponding to radioisotope signatures detected by the detection unit;
    a display unit for displaying results of the spectrum analysis; and
    a connecting unit for communicating with an expert system and for receiving instructions and radioisotope information for further processing of the radiation source,
    a common housing enclosing the detection unit, the spectrum analysis unit, the display unit and the connecting unit.

11. The portable hand-held system of claim 10, wherein the common housing includes a mobile telephone with a microprocessor for the analyzing of the radiation spectra.

12. The portable hand-held system of claim 10, wherein the ionizing radiation includes any of neutron, gamma and X-ray radiation.

13. The portable hand-held system of claim 10, further comprising a global positioning system receiver, and wherein the connecting unit communicates current position of the system to the expert system.

14. The portable hand-held system of claim 13, wherein the system includes a mobile telephone that includes a microprocessor for the analyzing of the radiation spectrum.

15. The system of claim 10, wherein the system is connected using a wireless protocol to a mobile device, the mobile device including a microprocessor for the analyzing of the radiation spectra, the mobile device being any of a laptop, a personal communicator and a mobile telephone.

16. A portable hand-held system for identification of a radiation source, the system comprising:
- a portable detection unit that detects gamma radiation, X-ray radiation and neutron radiation emitted due to nuclear decay in the radiation source and provides a corresponding detection signal based on the detected radiation;
- a radioisotope analysis unit for analyzing the detected radiation and for determining radioisotope information and a spectrum of the radiation;
- a display unit for displaying at least one of the radiation spectrum and the radioisotope information;
- a GPS receiver providing a current position information; and
- a connecting unit for communicating the results of the analysis and the current position information to a remote computer,
wherein the detection unit, the radioisotope analysis unit, the display unit, the GPS receiver and the connecting unit form an integral device.

* * * * *